United States Patent [19]

Rogov et al.

[11] 4,242,141

[45] Dec. 30, 1980

[54] RAPID-SETTING DRY PACKING MIX FOR ELIMINATING BORE HOLE TROUBLES AND METHOD OF MANUFACTURE THEREOF

[76] Inventors: Viktor F. Rogov, ulitsa Garibaldi, 30, korpus 2, kv. 70, Moscow; Nikolai K. Lipatov, ulitsa Mekhanizatorov, 1, kv. 4, Apatity Murmanskoi oblasti; Ruben A. Tatevosian, ulitsa Gorkogo 4, kv. 60; Mikhail Y. Titov, ulitsa Kominterna, 34/6, kv. 83, both of Moscow; Lev A. Tereschenko, ulitsa Gurdina, 5, kv. 34, Leningrad; Arian M. Yakovlev, Grazhdansky prospekt, 15, kv. 210, Leningrad, all of U.S.S.R.

[21] Appl. No.: 55,061

[22] Filed: Jul. 5, 1979

[51] Int. Cl.³ .................................. C04B 7/35
[52] U.S. Cl. ........................... 106/89; 106/109
[58] Field of Search ..................... 106/89, 109

[56] References Cited

U.S. PATENT DOCUMENTS

| | | | |
|---|---|---|---|
| 3,582,376 | 6/1971 | Ames | 106/109 |
| 3,852,081 | 12/1974 | Lehman | 106/89 |
| 3,861,929 | 1/1975 | Deets | 106/89 |
| 3,950,178 | 4/1976 | Jaklin | 106/89 |
| 3,997,353 | 12/1976 | Chervenka et al. | 106/109 |

*Primary Examiner*—James Poer
*Attorney, Agent, or Firm*—Fleit & Jacobson

[57] ABSTRACT

A rapid-setting dry packing mix for eliminating bore hole troubles contains: 40 to 50 percent by weight of cement powder, 50 to 60 percent by weight of gypsum or alabaster, 0.01 to 3.0 percent by weight of barium hexaferrite powder in particles commensurate in size with those of the binder.

A method for manufacturing the rapid-setting dry packing mix for eliminating bore hole troubles consists in a mechanical mixing in an alternating electromagnetic field powders of cement, gypsum or alabaster and barium hexaferrite taken in required proportions, the above barium hexaferrite powder being introduced through abrasion of working tools which are magnetized pellets prepared on the basis of barium hexaferrite.

7 Claims, No Drawings

RAPID-SETTING DRY PACKING MIX FOR ELIMINATING BORE HOLE TROUBLES AND METHOD OF MANUFACTURE THEREOF

BACKGROUND OF THE INVENTION

1. Field of the Invention

The invention relates to the field of hole boring, and more particularly, to a rapid-setting packing mix for eliminating bore hole troubles and to a method of manufacturing thereof.

The invention can be employed in geological survey, civil engineering surveys, petroleum and gas production and drilling and blasting operations for eliminating zones of geological troubles involving absorption of flushing fluid, water inflow or unstable spacing of holes.

2. Description of the Prior Art

There is known a dry packing mix for eliminating bore hole troubles prepared on the basis of a powder gypsum-cement binder containing 40 to 50 percent by weight aluminous cement and 50 to 60 percent by weight of gypsum or alabaster (see, for example, Collected works of the All-Union Research Institute for Surveying Methods and Equipment under the title "Metodika i tekhnika razvedki"/Surveying Methods and Equipment/, No. 114, 1974, Leningrad, pp. 67–69).

The known mix is to be delivered dry to bore hole trouble zones and prepared directly at the site of application upon walls of bore hole to form a lining.

Once the mix has been prepared in the hole and the lining formed, drilling tools are pulled out of the hole to deliver a new portion of the rapid-setting mix or for proceeding with the boring of the hole.

As the drilling tool is pulled out, there occurs a piston effect, i.e. a vacuum is built beneath the tool to create a pressure gradient in a liquid inside and outside of the lining, a high hydrostatic pressure remaining outside of the lining, but dropping inside the lining.

One-sided pressure promotes failure of the lining, since the rapid-setting mix from which the lining is built presents neigher adequate gain strength nor sufficient bonding to rocks which make up the walls of the hole.

The piston effect may bring about a complete separation of the lining from hole walls and out of cracks.

A similar result can be caused by vibration and pulsation of pressures in a medium involved due to rotation of drilling tool and string of rods in drilling of a rapid-setting packing mix of the known composition which fails to provide within a few minutes the necessary gain in strength for eliminating bore hole troubles.

In addition, the rapid-setting dry packing mix quickly loses activity in storage because of the interaction of cement and gypsum with moisture contained in the surrounding air.

The known rapid-setting dry packing mix for eliminating bore hole troubles is obtained by mechanical mixing of powder cement and gypsum or alabaster taken in specified proportions.

However, the above mixing method fails to provide the necessary uniformity of distribution of cement and gypsum or alabaster throughout the mix, this leading to the failure of the structure of the artificial stone lining being formed, the leaching of the material of the lining and, consequently, to a quick loss of tightness (two or three days after).

Additionally, the existing technique for manufacturing the known dry mix provides no means for improving the quality thereof, since it proves impossible to introduce the necessary additives in small amounts and to distribute them uniformly throughout the mix.

SUMMARY OF THE INVENTION

It is therefore an object of the invention to provide a rapid-setting dry packing mix possessing an adequately rapid strength gain rate.

Another object of the invention is to provide a mix featuring a sufficiently strong bond to rocks making up walls of holes.

Yet another object of the invention is to provide a rapid-setting dry packing mix which will retain its active properties in prolonged storage even under adverse conditions.

A further object of the invention is to provide a method for manufacturing a rapid-setting dry packing mix for eliminating bore hole troubles ensuring a required uniformity in distribution of cement and gypsum or alabaster throughout the mix so as to avoid the failure of the structure of the artificial stone of the lining being formed and the leaching of the material of the lining.

An additional object of the invention is to provide a method for preparing the mix ensuring the improvement in the quality thereof through introduction of specific additives in small amounts and a uniform distribution thereof throughout the mix.

The above and other objects are attained in a rapid-setting dry packing mix for eliminating bore hole troubles manufactured on the basis of a powder gypsum-cement binder containing 40 to 50 percent by weight of cement and 50 to 60 percent by weight of gypsum or alabaster, wherein, according to the invention, there are contained 0.01 to 3.0 percent by weight of barium hexaferrite powder in particles of a size commensurate with that of particles of the binder.

It is advisable to add 5 to 15 percent by weight of silica gel to the mix.

The above and other objects are also attained in a method for manufacturing the mix consisting in that the gypsum-cement binder is obtained by mechanical mixing of powder cement and gypsum or alabaster taken in required proportions, wherein, according to the invention, the components are mixed in an alternating electromagnetic field, whereas the barium hexaferrite powder is introduced at the expense of abrasion of working tools which are magnetized pellets prepared on the basis of barium hexaferrite.

It is advisable to employ pellets prepared solely from barium hexaferrite.

No less advantageous is to employ pellets manufactured of barium hexaferrite with inert additives.

It is preferable to have a proportion of pellets of greater abradability.

The rapid-setting dry packing mix for eliminating bore hole troubles and the method for the manufacture thereof ensure a required strength gain rate, a high bonding to rock making up hole walls and a long storage life even under adverse conditions.

DESCRIPTION OF THE PREFERRED EMBODIMENT

A rapid-setting dry packing mix for eliminating bore hole troubles is prepared on the basis of a gypsum-cement binder containing 40 to 50 percent by weight of cement and 50 to 60 percent by weight of gypsum or alabaster.

In addition, the mix contains 0.01 to 3.0 percent by weight of powder barium hexaferrite in particles of a size commensurate with that of particles of the binder.

A mix with less than 0.01 percent by weight barium hexaferrite fails to provide required strength and bonding characteristics.

Introduction into the mix of more than 3 percent by weight of barium hexaferrite substantially retards the beginning of setting and lowers the strength of the lining.

The mix can additionally carry from 5 to 15 percent by weight of silica gel introduced either as a powder or pellets.

The addition of silica gel increases the storage life of the mix.

The rapid-setting dry packing mix according to the invention for eliminating bore hole troubles is prepared in the manner below.

Powder cement and gypsum or alabaster taken in specified proportions are mixed in a chamber in an alternating electromagnetic field.

The addition to the mix of barium hexaferrite is effected through abrasion of pellets in the course of stirring in the chamber.

The barium hexaferrite pellets can be prepared either entirely of barium hexaferrite or with inert admixtures.

It proves to be advantageous to have a proportion of pellets of a greater abradability.

The invention will now be described with reference to the following illustrative Examples.

Properties of the rapid-setting dry packing mix are presented in Tables 1 through 3 accompanying the examples.

EXAMPLE 1

Components of the mix 50 percent of cement and 50 percent of alabaster, taken in an amount of 2 kg, were charged into a cylindrical chamber 100 mm in diameter holding 500 g of magnetized pellets of barium hexaferrite 5 mm in diameter.

The chamber is encompassed with an electromagnetic coil, or solenoid, having in cross section a height of 80 mm and a width of 45 mm with wound copper wire 2 mm in diameter.

Once the electromagnetic coil was connected to a 220 V, 50 Hz (cps) mains, the magnetized balls moved in chaotic manner to stir the mix components in the chamber.

After a ten-second period of treatment, the following mix was obtained, containing in percent by weight:
alabaster: 49.995
cement: 49.995
barium hexaferrite: 0.01

EXAMPLE 2

To raise the content of barium hexaferrite, 100 g of similar pellets having a great abradability (manufactured at a temperature by 50° C. lower than the recommended—1250° C.—value) were added to the remaining 497.8 g of pellets (Example 1).

All the other process parameters were unaltered.

After a ten-second period of treatment, the following mix was obtained, containing in percent by weight:
alabaster: 49.95
cement: 49.95
barium hexaferrite: 0.1

EXAMPLE 3

After a fifty-second period of treatment of 2 kg of mixture composed of 50 percent by weight of cement and 50 percent by weight of alabaster, a mix was obtained, of the following composition, in percent by weight:
cement: 49.5
alabaster: 49.5
barium hexaferrite: 0.1

All the other parameters of the process described in the Example 1 were unaltered.

EXAMPLE 4

After a ten-second period of treatment of 2 kg of mixture composed of 50 percent by weight of cement and 50 percent by weight of alabaster, a mix was obtained of the following composition, in percent by weight:
alabaster: 48.5
cement: 48.5
barium hexaferrite: 3

Subsequently, the setting time and the strength in uniaxial compression of the above mixes were determined.

The mixes were tested for setting time by the Vicat needle method, whereas tests for strength in uniaxial compression were carried out on cubes measuring 7×7×7 cm. The results of the tests are listed in the table below:

TABLE 1

Packing mix Setting Time and Strength in Unaxial Compression, kg/cm$^2$

| No. of Example | Mix composition: cement - C alabaster - A, barium hexarite - H percent by weight | Setting time start (min.) | Setting time end (min.) | Strength in unaxial compression, kg/cm$^2$ hardening conditions air 1 hr | air 2 hrs | air 3 hrs | hydraulic 1 hr | hydraulic 2 hrs | hydraulic 3 hrs |
|---|---|---|---|---|---|---|---|---|---|
| 1. Check sample | C - 50 A - 50 | 6 | 8 | 17 | 26 | 70 | 22 | 20 | 75 |
| 2. Example 1 | C - 49.995 A - 49.995 H - 0.01 | 7 | 9 | 18 | 26 | 70 | 25 | 20 | 75 |
| 3. Example 2 | C - 49.95 A - 49.95 H - 0.01 | 14 | 15 | 60 | 148 | 198 | 75 | 70 | 180 |
| 4. Example 3 | C - 49.5 A - 49.5 H - 1.0 | 14 | 16 | 27 | 36 | — | — | — | — |
| 5. Example 4 | C - 48.5 | 20 | 25 | 18 | 22 | — | — | — | — |

TABLE 1-continued

| | Mix composition: cement - C alabaster - A, barium hexarite - H percent by weight | Setting time | | Strength in unaxial compression, kg/cm² hardening conditions | | | | | |
|---|---|---|---|---|---|---|---|---|---|
| | | | | air | | | hydraulic | | |
| No. of Example | | start (min.) | end (min.) | 1 hr | 2 hrs | 3 hrs | 1 hr | 2 hrs | 3 hrs |
| | A - 48.5 H 3.0 | | | | | | | | |

Table 1 header: Packing mix Setting Time and Strength in Unaxial Compression, kg/cm²

As is readily apparent from this table, the best physicochemical properties are those of a packing mix containing: cement, 49.95 percent by weight; alabaster, 49.95 percent by weight; and barium hexaferrite, 0.1 percent by weight.

A packing mix containing: cement, 49.995 percent by weight; alabaster, 49.995 percent by weight; and barium hexaferrite, 0.01 percent by weight differs very little in properties from the check sample, whereas a packing mix having the following composition: cement, 48.5 percent by weight; alabaster, 48.5 percent by weight; and barium hexaferrite, 3.0 percent by weight features a substantially longer setting time and lower strength.

Therefore, further tests concerned the packing mix having the best physicochemical properties, or the mix containing: cement, 49.95 percent by weight; alabaster, 49.95 percent by weight; and barium hexaferrite, 0.1 percent by weight.

Results of tests for strength of bonding of cement stone to rock (in tension) are listed in Table 2, were C—cement, A—alabaster, H—barium hexaferrite.

TABLE 2

Strength of Bonding of Cement Stone to Rock in Tension, g/cm²

| Mix composition, per cent by weight | Basalt contact time, min. | | | | Quartz listvenite contact time, min. | | | | Chalk sandstone contact time, min. | | | |
|---|---|---|---|---|---|---|---|---|---|---|---|---|
| | 5 | 10 | 15 | 20 | 5 | 10 | 15 | 20 | 5 | 10 | 15 | 20 |
| Check mix C - 50 A - 50 | 3.18 | 6.5 | 14.3 | 19.0 | 3.18 | 6.7 | 15.4 | 22.2 | 3.21 | 6.9 | 14.5 | 24.1 |
| C - 49.95 A - 49.95 H - 0.1 | 1.98 | 6.3 | 15.4 | 40.9 | 2.4 | 6.5 | 17.5 | 46.0 | 2.8 | 7.5 | 22.1 | 56.3 |

Because of a high activity of the packing mix according to the invention and due to the problems involved in its storage during geological parties, some silica gel, in the form of both powder and pellets or as a mixture of these, is added to the mix.

Investigations of the variation of properties of the packing mix containing: cement, 49.95 percent by weight; alabaster, 49.95 percent by weight; and barium hexaferrite, 0.1 percent by weight which has been stored under Arctic conditions are given in Table 3.

TABLE 3

Variation of the Properties of a Packing Mix Stored under Arctic Conditions

| No. of Example | Addition of silica gel, percent by weight | Friability | | | | Compressive strength in percent of the starting valve | | | |
|---|---|---|---|---|---|---|---|---|---|
| | | 0 mo. | 6 mo. | 12 mo. | 24 mo. | 0 mo. | 6 mo. | 12 mo. | 24 mo. |
| Check | — | good | bad | bad | bad | 100 | 40 | — | — |
| 1 | 5 | good | good | med. | bad | 100 | 100 | 80 | 30 |
| 2 | 10 | good | good | good | med. | 100 | 100 | 100 | 80 |
| 3 | 15 | good | good | good | good | 100 | 100 | 100 | 100 |
| 4 | 20 | good | good | good | good | 80 | 80 | — | — |

The table shows clearly that a mix with 5 percent by weight of silica gel retains its high physico-mechanical properties for up to 1 year, but these, however, substantially deteriorate in further storage.

On the other hand, an addition of 20 percent of silica gel results in a loss of strength by the cement stone, so that the optimum content of silica gel is to be taken equal to 15 percent by weight.

What is claimed is:

1. A rapid-setting dry packing mix for eliminating bore hole troubles prepared on the basis of a powder gypsum-cement binder comprising:
   from 40 to 50% by weight of powder cement;
   from 50 to 60% by weight of powder binder selected from the group consisting of gypsum and alabaster; and
   from 0.01 to 3.0% by weight of powder barium hexaferrite having a particle size commensurate with the particles of the binder.

2. The mix of claim 1, further comprising from 5 to 15% by weight of silica gel.

3. A method for obtaining a rapid-setting dry packing mix prepared on the basis of a powder gypsum-cement binder, the mix comprising:
   from 40 to 50% by weight of powder cement;

from 50 to 60% by weight of powder binder selected from the group consisting of gypsum and alabaster; and from 0.01 to 3.0% by weight of powder barium hexaferrite having a particle size commensurate with the particles of the binder, the method comprising the steps of mixing magnetized pellets containing barium hexaferrite with said powder cement and said powder binder and subjecting the resulting mixture to an alternating electromagnetic field whereby the magnetized pellets move in a chaotic manner to stir the mixture and whereby barium hexaferrite is added to the rapid-setting dry packing mix by abrasion of the magnetized pellets.

4. The method of claim 3, wherein the rapid-setting dry packing mix further comprises from 5 to 15% by weight of silica gel.

5. The method of claim 3, wherein the magnetized pellets are composed entirely of barium hexaferrite.

6. The method of claim 3, wherein the magnetized pellets comprise barium hexaferrite and at least one inert additive.

7. The method of claims 5 or 6 wherein at least a portion of the magnetized pellets have a greater abradability than the remaining portion.

* * * * *